May 4, 1948.   J. M. PATTERSON   2,440,697
WORK OPERATOR FOR WELDING MECHANISM
Filed March 3, 1945
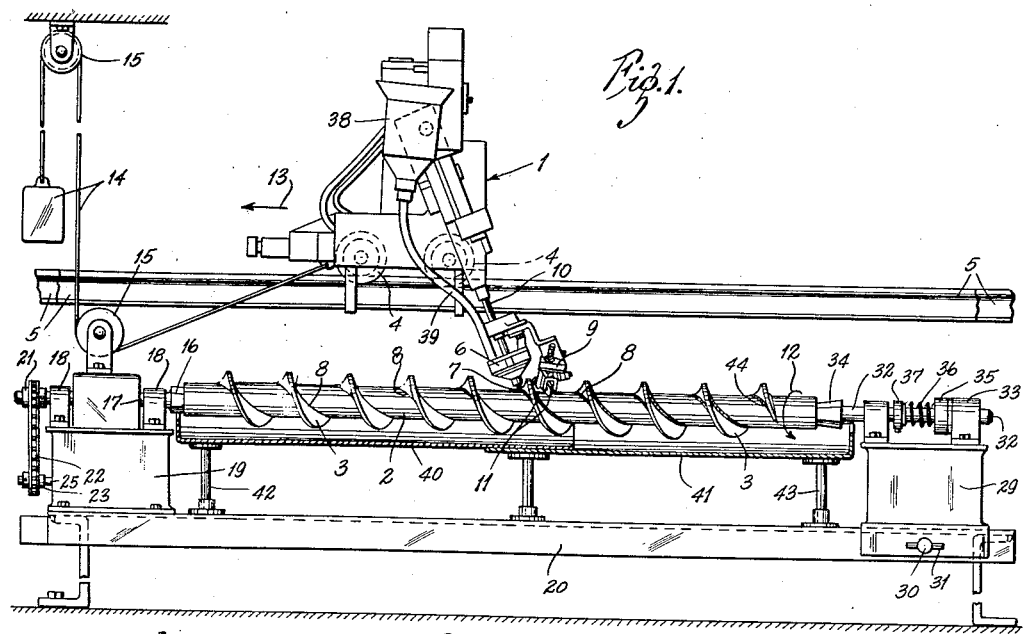
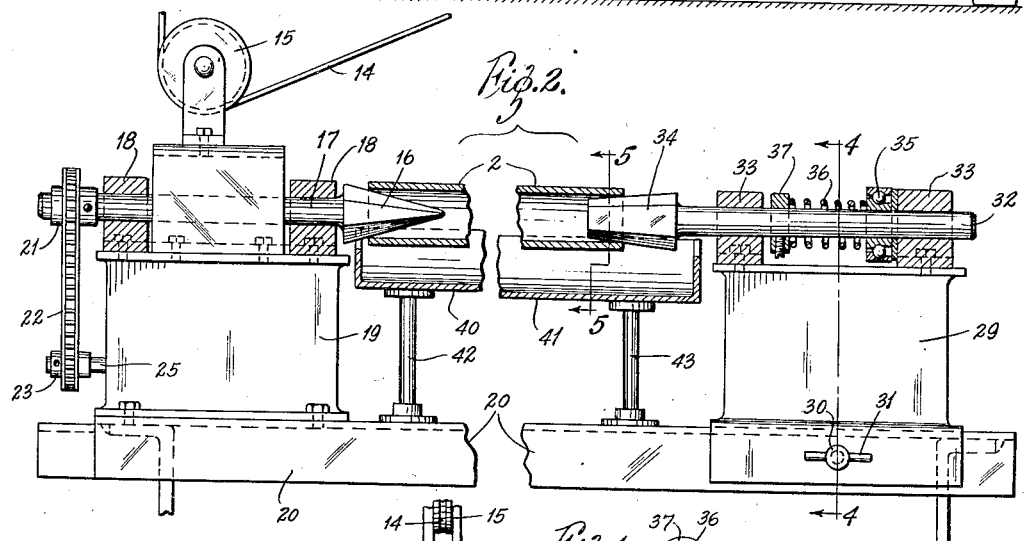
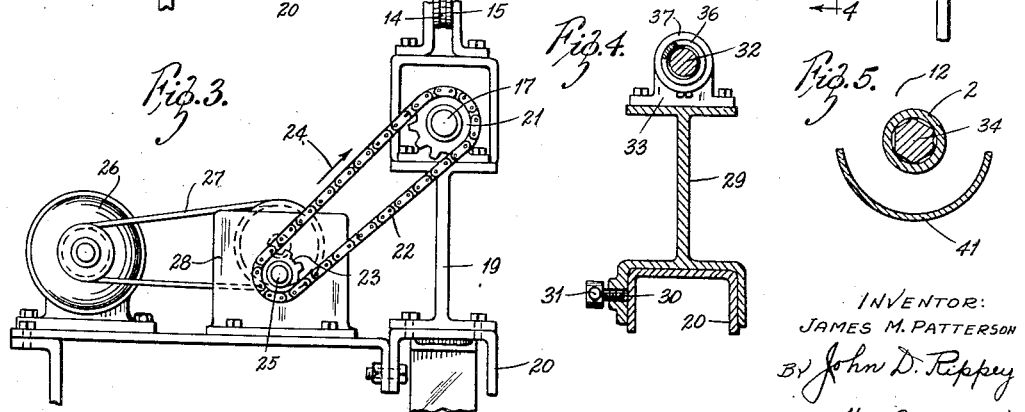
INVENTOR:
JAMES M. PATTERSON
BY John D. Rippey
HIS ATTORNEY.

Patented May 4, 1948

2,440,697

UNITED STATES PATENT OFFICE 2,440,697

WORK OPERATOR FOR WELDING MECHANISM

James M. Patterson, Jennings, Mo., assignor to Central Mine Equipment Co., St. Louis, Mo., a corporation of Missouri Application March 3, 1945, Serial No. 580,757

3 Claims. (Cl. 219—8)

This invention relates to a work operator for welding mechanism; and it has special reference to an apparatus for supporting and rotating a cylindrical work-piece about its axis during welding of a spiral flight or other circumferential part to said cylindrical work-piece.

An object of the invention is to provide an apparatus for supporting and rotating a cylindrical work-piece adjacent to a welding mechanism while a spiral flight or other circumferential part is being welded to said work-piece by welding material fed thereto through said welding mechanism; to move said welding mechanism along said work-piece and spiral flight during the welding of said spiral flight to said work-piece; and to prevent displacement of said welding mechanism during welding of any other circumferential part to said work-piece not requiring movement of said welding mechanism.

Another object of the invention is to provide an apparatus comprising two axially spaced gripper elements for engaging and supporting between them a cylindrical auger or conveyor section having thereon and extending axially through a spiral flight having its inner peripheral edge contacting with the outer peripheral surface of said auger or conveyor section, mechanism for rotating one of said gripper elements and thereby rotating said auger or conveyor section and said spiral flight in cooperative relationship to an adjacent welding mechanism for welding said spiral flight to said auger section or conveyor while said section and said spiral flight are continuously rotating, and means cooperating with said spiral flight for moving said welding mechanism in a plane parallel with the axis of rotation of said auger section or conveyor.

Another object of the invention is to provide an apparatus for cooperatievly controlling rotary movement of a cylindrical auger or conveyor section and a spiral flight thereon during the operation of welding said spiral flight thereto, and for effecting integral weld attachment of said flight to said section by a weld having a continuously smooth surface substantially free from indentations, projections and other surface irregularities, to facilitate the movement of material along said flight during rotation thereof, in its intended use, and to obtain a better weld attachment than is possible by manual manipulation.

Other objects will appear from the following description, reference being made to the annexed drawing, in which—

Fig. 1 is a side elevation of my improved work operator for welding mechanism having a cylindrical auger or conveyor section and a spiral flight or rib on said auger or conveyor section mounted in said work operator for rotation during action and operation of said welding mechanism, parts being shown in section.

Fig. 2 is an enlarged side elevation of the supports for the two rotative gripper elements by which a cylindrical auger or conveyor part is engaged, supported and rotated, with a spiral flight thereon, during operation of the welding mechanism, bearings for the shafts of said gripper elements and a portion of said cylindrical part being shown in section.

Fig. 3 is an end elevation of my improved work operator for welding mechanism, showing a motor and connections driven by said motor for rotating one of the work supporting gripper elements.

Fig. 4 is a vertical sectional view on the line 4—4 of Fig. 2, showing a releasable and movable support for one of the two work supporting gripper elements.

Fig. 5 is a sectional view on the line 5—5 of Fig. 2, showing one work supporting gripper element supporting and gripping a cylindrical auger or conveyor section.

The modification of the invention shown in the drawing is an apparatus for supporting and operating, by rotation, a cylindrical work-piece adjacent to a movable welding mechanism while a spiral flight or other circumferential part is being welded and integrally united to said work-piece by a weld applied and affixed by said welding mechanism, and for moving said welding mechanism along said work-piece and spiral flight during the welding operation, and for preventing movement of said welding mechanism during welding of any other circumferential part to said cylindrical work-piece when no movement of said welding mechanism is needed or required.

An electric welding machine 1 of known construction is supported for longitudinal movements in a plane parallel with the longitudinal axis of a rotative cylindrical auger or conveyor section 2. The said rotative auger or conveyor section 22 has thereon and extends axially through a spiral flight 3 having its inner peripheral edge contacting with the outer peripheral surface of said auger or conveyor section. The said welding machine 1 is supported by a truck comprising wheels 4 operating on and along two spaced parallel rails 5 forming a supporting and guiding track. During operation of said welding machine, welding composition is fed through a welding head 6 supported and carried by the welding machine 1 and having welding rod electrodes 7 adjacent to the periphery of the cylindrical auger or conveyor section 2 near the joint or line of contact 8 between said section 2 and the spiral flight 3 thereon. Heretofore, in the manufacture of this type of rotary earth augers, mining augers, and spiral conveyors, including said rotary section 2 and said spiral flight 3, considerable difficulty has been experienced in effecting a proper welding attachment between said two parts. It has been the general practice to effect said welding attachment between said two parts manually, with the result that generally it has been impossible to provide a continuously smooth surface substantially free from indentations, projections and other surface irregularities. Said manual welding has been generally necessary, for the reason that heretofore, it has been difficult or impossible to move an electric welding machine longitudinally with respect to the longitudinal axis of an auger or conveyor section 2 automatically and as an incident to rotation of said section. Generally, it has been impossible to provide a welded connection attaching the spiral flight 3 directly to the section 1 automatically and as an incident to the rotation of said parts. The present invention provides a satisfactory solution of this difficulty, and holds the welding machine 1 and the electrodes 7 of the head 6 in proper position relative to the joint 8, regardless of any irregularities in and along the surface of said section 2, regardless of any irregularities in and along the inner peripheral portions of the spiral flight 3, and regardless of any irregularities in the spiral formation of said flight 3. By this invention, the welding machine is moved in synchronism with the spiral of the flight 3 regardless of said irregularities, and regardless of variations in the pitch of said flight 3. For the attainment of these results, the welding machine is equipped with a device 9 attached to and supported by the head 6 and the shaft 10 of said welding machine. The device 9 comprises rollers 11 for operating on and along the peripheral surface of the auger or conveyor section 2, and also against the opposite side of the spiral flight 3 from the electrodes 7, as disclosed in my prior application Serial No. 553,822, filed September 13, 1944. The said rollers 11 that operate on and along the peripheral surface of the auger or conveyor section 2 positively hold the electrodes 7 properly spaced away from said surface, while the roller 11 that operates along and against the flight 3 functions to control movement of the welding machine 1 in synchronism with said flight 3. An actuator is provided for moving the welding machine 1, and for holding said roller 11 pressed against the opposite side of the spiral flight 3 from the electrodes 7. The said electrodes 7 are thereby held close to the joint 8 for proper application of a weld integrally uniting the section 2 and the flight 3, during movement of said welding machine 1 to its initial position. In the modification of the invention shown, the cylindrical auger of conveyor section 2 is rotated in the direction of the arrow 12, while said actuator, in cooperation with the device 9—11 operating against the flight 3, controls movement of the welding machine 1 in the direction of the arrow 13. The said actuator 14 may consist of a section of rope or cord having one end attached to the welding machine 1 and the opposite end attached to a weight, while an intermediate portion of said rope or cord engages sheaves 15.

A gripper element 16 is attached to a shaft 17 rotatively journalled in bearings 18 attached to a support 19 rigidly secured to a base 20. The shaft 17 is rotative in bearings 18, and is incapable of substantial longitudinal displacement. A sprocket wheel 21 is attached to the end of a shaft 17 opposite from the gripper element 16, and is engaged by a sprocket chain 22 engaging and operated by a sprocket wheel 23 in the direction of the arrow 24 (Fig. 3). The sprocket wheels 21 and 23 and the sprocket chain 22 constitute gearing for rotating the shaft 17 at the desired speed. The sprocket wheel 23 is attached to a stud shaft 25 rotated by a motor 26 through a belt connection 27 and familiar speed reducing gearing enclosed within a gear box 28 in order to rotate the shaft 17 and the gripper element 16 at the desired speed of rotation.

A support 29, complementary to the support 19, is mounted for sliding movements along the base 20 toward and from said support 19. Said support 29 may be secured rigidly in any adjustment in which it is placed on the base 20 by said sliding movements by a clamping set screw 30 mounted in said support 19 for clamping engagement with said base. A handle 31 attached to the set screw 30 is operative to turn and set said set screw in clamping engagement with the base 20 to hold the support 19 from displacement, and to release said set screw to permit longitudinal sliding movement of said support 29 on and along said base 20 toward and from the rigid and immovable support 19.

A shaft 32 is rotatively journalled in two spaced bearings 33 mounted on the support 29 and in axial alinement with the shaft 17. A gripper element 34 complementary to the gripper element 16 is attached to the end of the shaft 32 that is toward the shaft 17 and cooperates with said gripper element 16 to engage, to support, and to rotate the cylindrical auger or conveyor section 2. In the form shown, said cylindrical auger or conveyor section 2 is tubular, and the said gripper elements 16 and 34 engage in opposite ends of said auger or conveyor section. Both gripper elements 16 and 34 taper toward their adjacent ends and both are preferably polygonal in cross-section in order to effect positive gripping engagement with the inner peripheries of the cylindrical and tubular auger or conveyor section 2 when said gripper elements are extended into the ends of said section 2. It is evident that these gripper elements may be of other form or shape adapted to engage opposite end portions of work-pieces which are not of hollow or tubular form, as is the auger or conveyor section 2. That is to say, any types of gripper devices for engaging, supporting and rotating a work-piece may be employed without departure from the invention. The shaft 32 is rotative, and is also movable longitudinally in said bearings 33. An antifriction thrust bearing 35 is mounted on the shaft 32 between the bearings 33, and engages against the inner side of that one of said bearings 33 that is most remote from the gripper element 34. A strong coiled spring 36 mounted on the shaft 32 has its outer end pressing against the inner raceway or ring of said anti-friction bearing 35, and its inner end pressing against a collar 37 rigid on said shaft 32. This leaves said spring 36 rotative with the shaft 32 which is freely rotative in the bearings 33, and also axially movable in said bearings to the extent permitted by said spring 36 and said collar 37. As shown in Figs. 1 and 2, the spring 36 is held under compression by the collar 37 which is held away from the adjacent bearing 33 by the gripper element 34 engaging the outer end of the rotative and longitudinally immovable work-piece 2.

The granular material used in welding by the welding machine 1 is conducted from a hopper 38 on said machine to the welding head 6 and electrodes 7 through a conduit 39. After being delivered onto the work-piece 2 at the electrodes 7, the remnants of said granular material are caused to drop from the rotating work-piece 2 by gravity or otherwise into a receptacle provided to receive said material. As shown, said receptacle is in the form of a trough comprising two telescoping parts 40 and 41. The parts 40 and 41 extend one within the other and are movable relatively in longitudinal directions in order to vary the length of the trough receptacle formed by said two parts in conformity with the length of the work-piece 2 that must be engaged, supported and rotated by the gripper elements 16 and 34. As shown in Fig. 1, the work-piece 2 constituting an auger or conveyor section is of maximum length and the two trough parts 40 and 41 are adjusted so that said auger or conveyor section 2 is wholly above the trough receptacle formed by said two parts 40 and 41. This permits all of the granular material and other remnants of the welding operation to be deposited in said trough receptacle from which said remnants may be removed and sifted, and the usable portions thereof used over and over again. As shown, the trough parts 40 and 41 are supported, respectively, by frame members 42 and 43 movably mounted on the base 20.

In the use of this apparatus, the trough parts 40 and 41 are adjusted to form a trough of proper length for the work-piece that is to be engaged, supported and rotated by the gripper elements 16 and 34 in a welding operation. The set screw 30—31 is released to permit movement of the support 29 from and toward the support 19 in order to engage and support the work-piece with and by the two gripper elements 16 and 34. The support 29 is moved to such a position toward the support 19 that the spring 36 is under some compression, with the collar 37 out of engagement with and spaced from the adjacent bearing 33, leaving the shaft 32 freely and easily rotative. The electrodes 7 of the welding machine are electrically energized and the welding machine is operated to feed the welding material to the electrodes 7 in synchronism with the operation of the motor 26 to rotate the shaft 17 and thereby the attached gripper element 16, as well as the work-piece 2 engaged, supported and rotated by the gripper elements 16 and 34. Rotation of said work-piece also rotates said gripper element 34 and the shaft 32, as well as the bearing 35, the spring 36 and the collar 37 that are supported by said shaft 32. When a spiral flight 3 is to be attached to an auger or conveyor section, the roller 11 engaging said spiral flight 3 controls movement of the welding machine in the direction of the arrow 13 by the actuator 14, while the rollers 11 on the surface of the work-piece 2 hold the electrodes 7 properly spaced from said auger or conveyor section. During this movement, the welding machine continuously operates and functions, and a perfect weld 44 is formed at and along the joint 8 integrally uniting the work-piece 2 and the spiral flight 3. This weld is continuously smooth, having a polished and glass-like surface, and is substantially free from indentations, projections and other irregularities which generally and, I believe, invariably occur in welding these parts by hand operation. After the welding has been completed along one side of the spiral flight 3, the set screw 30—31 is released, the support 29, shaft 32 and gripper element 34 are moved in a direction away from the support 19 in order to release the work-piece and permit its disengagement from both gripper elements 16 and 34. When a weld is to be formed along the opposite side of the spiral flight 3, the auger or conveyor section 2 is reversed end for end; that is to say, the end that had been engaged by the gripper element 16 is engaged with the gripper element 34, and the end of said section 2 that had been engaged with the gripper element 34 is engaged with the gripper element 16. In the meantime, the welding mechanism 1 has been deenergized and returned to its initial or starting position at the right (Fig. 1) preparatory for another welding operation. Prior to removal and during replacement of the auger or conveyor section 2, the electric motor 26 is deenergized and stopped, thereby stopping rotation of the shaft 17 and also stopping rotation of the gripper elements 16 and 34 and of the auger or conveyor section 2 engaged and supported thereby. Both the welding mechanism 1 and the motor 26 remain deenergized until replacement of the auger or conveyor section 2 has been completed, as above described. Then electrical energy is supplied to the welding electrodes 7 of said welding mechanism, and the motor 26 also is energized and started, with the result that a smooth and polished weld 44 is applied to the side of the spiral flight 3 opposite from that on which the weld 44 had been applied during the first welding operation. When it is not desired to apply a weld such as the weld 44 to the opposite side of the part being welded to a work-piece, said work-piece is not reversed end for end in connection with the gripper elements 16 and 34, as above described, but is removed therefrom.

From the foregoing, it is evident that this invention supports and rotates a work-piece during operation of the welding machine while a spiral flight or other circumferential part is being integrally attached to said work-piece by a weld having a smooth, polished and nearly glass-like surface; that the welding machine is moved along the work-piece and spiral flight during welding of said spiral flight to said work-piece by the roller 11 that operates against said spiral flight; and that said roller 11 will prevent displacement of the welding machine during the welding of any circumferential part of different form which does not require movement of said welding machine. The invention may be varied as widely in its construction, as the scope of equivalents will permit, without departure from the nature and principle thereof as defined by the appended claims.

I claim:

1. In an apparatus of the character described, two axially alined spaced gripper elements for engaging, supporting and rotating a cylindrical auger or conveyor section in synchronism with a spiral flight about said section, mechanism for rotating one of said gripper elements and thereby said section and said other gripper element, a device for holding said other gripper element in different respective adjusted positions toward and from said one gripper element that is rotated by said mechanism, a spring for actuating one of said two gripper elements into engagement with said auger or conveyor section mounted between said two gripper elements, and a traveling welding mechanism for applying a weld along the joint between said section and said spiral flight during rotation of said section and said flight, said welding mechanism having a part engaging said spiral flight for controlling travel of the welding mechanism in accordance with the rotation of said spiral flight.

2. An apparatus of the character described for supporting and rotating a cylindrical work-piece, comprising two axially alined spaced shafts, gripper elements attached to adjacent ends of said shafts for engaging, supporting and rotating a cylindrical auger or conveyor section in synchronism with a spiral flight about said section, means for supporting said shafts for rotation in different spaced distances apart for engaging said gripper elements with auger or conveyor sections of different respective lengths, a spring for actuating one of said shafts in the direction of the other shaft, mechanism for rotating one of said shafts and thereby said auger and conveyor section and said other shaft, and traveling welding mechanism for applying a weld along the joint between said section and said spiral flight during rotation of said section and said flight, said welding mechanism having a part engaging said spiral flight for controlling travel of the welding mechanism in accordance with the rotation of said spiral flight.

3. An apparatus of the character described, comprising two axially alined spaced shafts, gripper elements attached to adjacent ends of said shafts for engaging, supporting and rotating a cylindrical auger or conveyor section in synchronism with a spiral flight about said section, electric mechanism for rotating one of said gripper elements and thereby said section and said other gripper element, a spring actuating said other gripper element into engagement with said section, a movable welding mechanism for applying a weld along the joint between said section and said spiral flight during rotation of said section and said flight, and means for coordinating movement of said welding mechanism relative to said section with the progress of said flight during rotation of said section and said flight.

JAMES M. PATTERSON.

REFERENCES CITED

The following references are of record in the file of this patent:

UNITED STATES PATENTS

| Number | Name | Date |
|---|---|---|
| 1,875,483 | Naylor | Sept. 6, 1932 |
| 2,041,461 | Floyd et al. | May 19, 1936 |
| 1,933,954 | Andrew | Nov. 7, 1933 |
| 2,039,690 | Frainer | May 5, 1936 |